United States Patent [19]
Ahlsten

[11] Patent Number: 5,535,964
[45] Date of Patent: Jul. 16, 1996

[54] MEDICAL TRANSPORT APPARATUS

[75] Inventor: George E. Ahlsten, Wheaton, Minn.

[73] Assignee: Spectrum Aeromed, Inc., Wheaton, Minn.

[21] Appl. No.: 180,682

[22] Filed: Jan. 12, 1994

[51] Int. Cl.⁶ ........................................................ B64D 9/00
[52] U.S. Cl. ............................ 244/118.5; 296/19; 414/535
[58] Field of Search ............................ 244/118.5, 118.6, 244/137.1, 137.2; 296/19, 20; 414/522, 532, 531, 533, 534

[56] References Cited

U.S. PATENT DOCUMENTS

| | | | |
|---|---|---|---|
| 2,199,097 | 4/1940 | Chapelle | 414/535 |
| 4,483,499 | 11/1984 | Frank | 244/137.1 |
| 4,783,025 | 11/1988 | Maffett | 244/118.5 |
| 4,783,109 | 11/1988 | Bucalo | 296/20 |
| 4,957,121 | 9/1990 | Isenogle et al. | 244/118.5 |
| 5,014,935 | 5/1991 | Dalbera | 244/137.1 |

FOREIGN PATENT DOCUMENTS

| | | | |
|---|---|---|---|
| 443289 | 6/1913 | France | 296/19 |
| 2533515 | 3/1984 | France | 414/537 |
| 337855 | 10/1920 | Germany | 296/19 |

Primary Examiner—Galen L. Barefoot
Attorney, Agent, or Firm—Robert E. Kleve

[57] ABSTRACT

The invention comprises a bench and loading lift for supporting a stretcher on an aircraft and for loading the stretcher onto the bench, while the bench is on the aircraft. The bench has a top surface for supporting a stretcher thereon with a slidably adjustable oxygen and vacuum outlet to provide oxygen and a vacuum at a selected locations along the bench by sliding the adjustable oxygen and vacuum outlets along the bench. The bench has sleeve structure at adjustable locations along the bench for receiving the mounting pin at the forward end of a ramp or lift for supporting the forward end of the ramp at an adjustable location on the bench while the bench is in an aircraft. The lift has vertically adjustable rear leg structure adapted to engage the ground outside the aircraft and adjustable to enable the lift to be adjusted to a suitable height for receiving a stretcher, with a patient thereon, on the ground and sliding the stretcher along the lift onto the bench inside the aircraft.

10 Claims, 5 Drawing Sheets

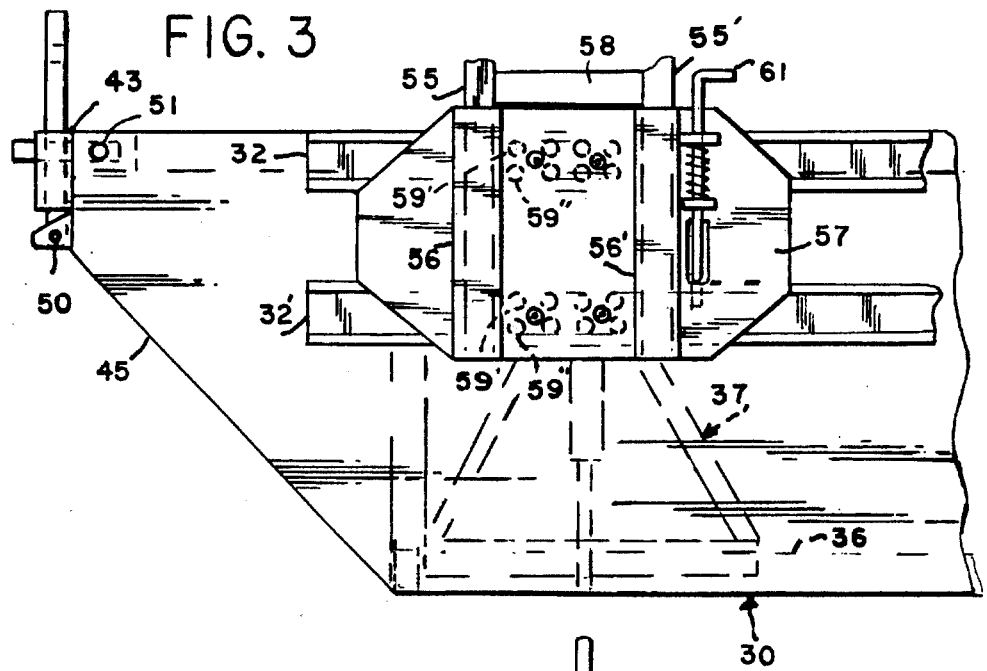
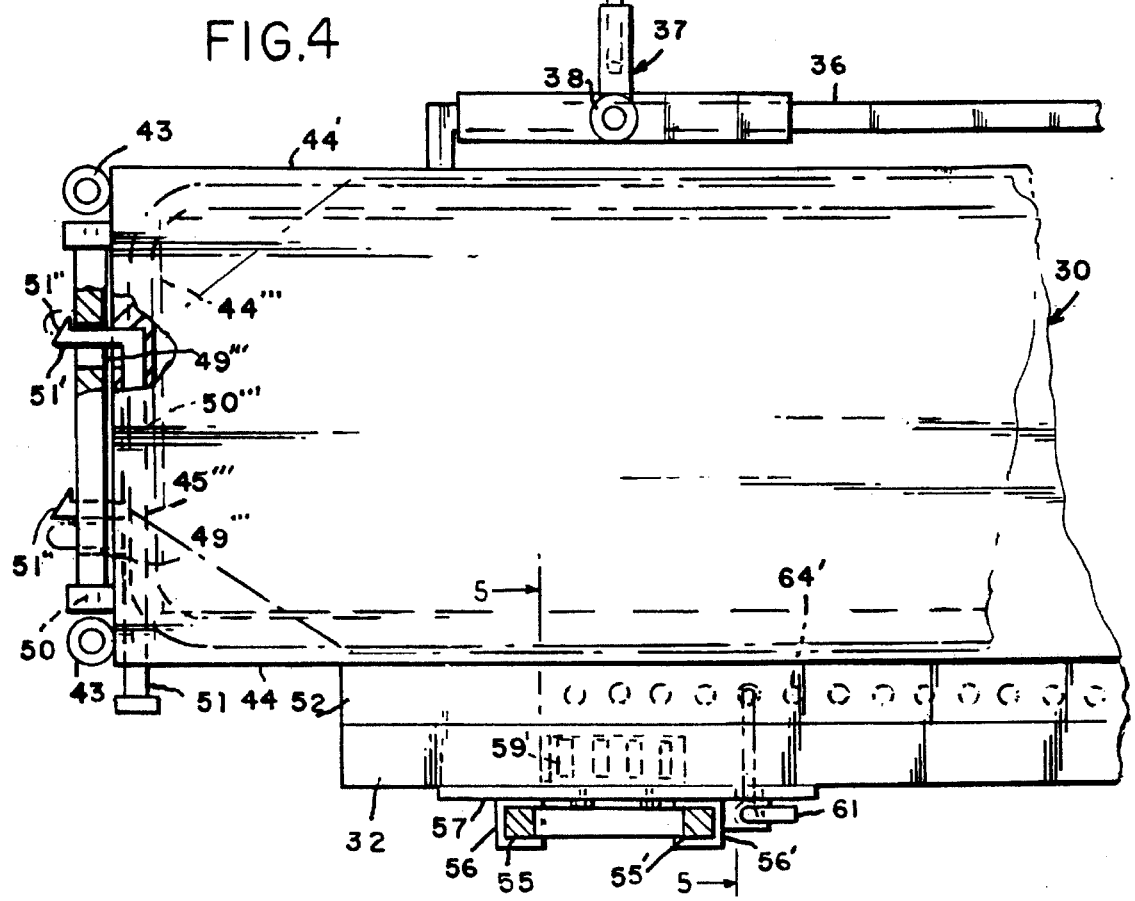

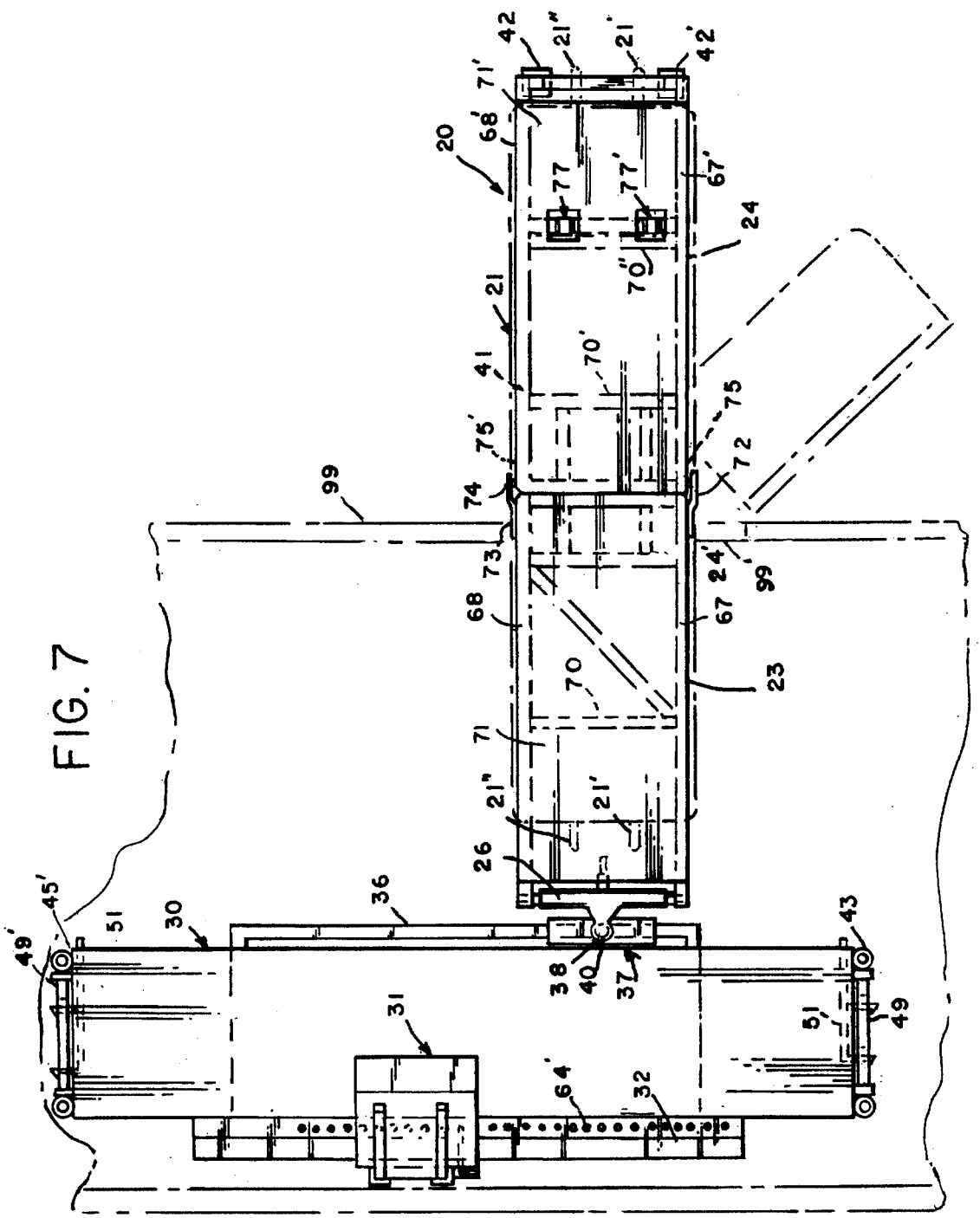

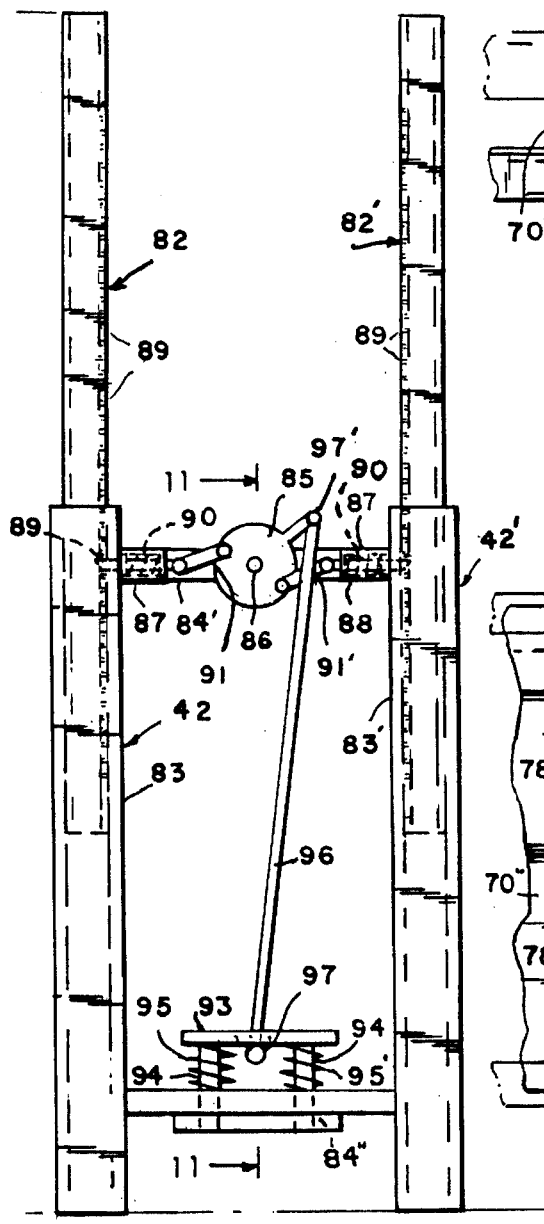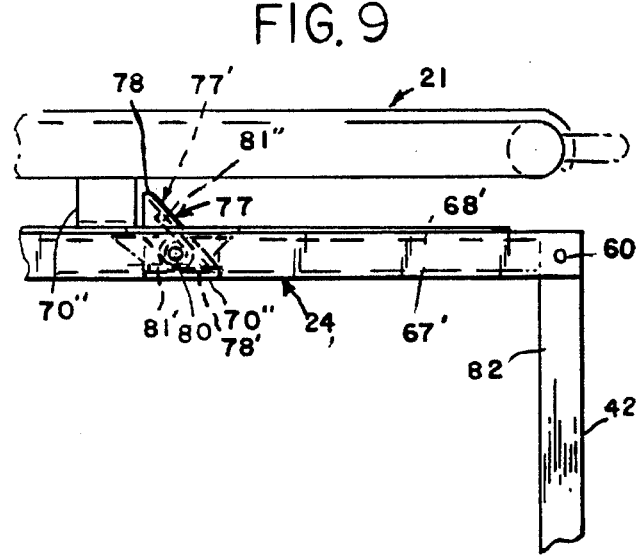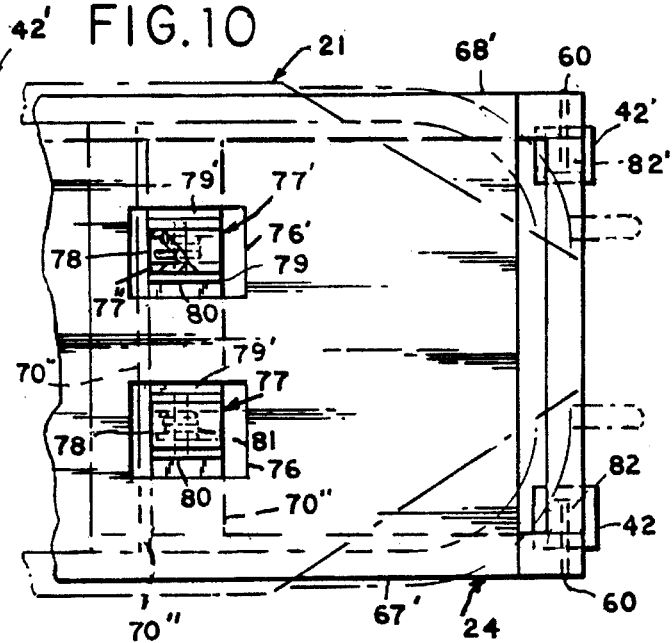

MEDICAL TRANSPORT APPARATUS

This invention relates to stretcher support and stretcher handling equipment. This invention is also related to my earlier co-pending patent application Ser. No. 129,684, Filed: Sep. 30, 1993, entitled: Stretcher Apparatus.

It is an object of the invention to provide a novel bench apparatus for supporting a stretcher thereon and a novel lift structure for operation with said bench for loading a stetcher onto a bench from the ground while the bench is located on an aircraft and the aircraft is on the ground.

It is a further object of the invention to provide a novel bench for supporting a stretcher thereon.

It is another object of the invention to provide a novel lift structure for conveying and lifting a patient onto a vehicle such as an aircraft.

It is a further object of the invention to provide a novel bench structure for mounting on an aircraft with the bench structure having means for attachment of a ramp thereto which ramp extends out from the bench and aircraft to the ground adjacent the aircraft for conveying a patient on a stretcher from the ground to the bench on the aircraft.

It is a further object of the invention to provide a novel bench for supporting a stretcher, which bench has novel adjustment structure outlets on the bench to facilitate utilizing the bench to provide medical attention to a patient on the stretcher while on the bench.

BRIEF DESCRIPTION OF THE DRAWINGS

FIG. 3 is an enlarged fragmentary side elevational view, reverse to FIG. 1, of the bench structure an the adjustable lift or ramp attachment structure for mounting a lift or ramp at at one end to the bench at selected locations along the bench.

FIG. 4 an enlaraged fragmentary top view of the bench structure illustrating the adjustable outlet mechanism, and the lift attachment structure for attachment of a lift to the bench.

FIG. 7 is a top plan view of the bench and lift and their being positioned and attached, similar in attachment and position as shown in FIG. 6.

FIG. 8 is a cross-sectional view taken along line 8—8 of FIG. 6.

FIG. 9 is an enlarged fragmentary view of the lift structure illustrating the latch mechanism on the lift for latching a stretcher onto the lift, with the stretcher shown in phantom lines.

FIG. 10 is an enlarged top view of the lift structure illustrating the letch mechanism for latching and holding a a stretcher on the lift or ramp.

BRIEF DESCRIPTION OF THE PREFERRED EMBODIMENT

Briefly stated, the invention comprises a bench for supporting a stretcher thereon while the bench and the stretcher are on an aircraft. The bench has a slidably adjustable outlet console with an oxygen, vacuum, and air outlet on the console and with the console being slidable to a selected position along the length of the bench to provide oxygen, vacuum and air outlet at a selected location along the bench for treatment of a patient on the stretcher on the bench in an aircraft. The invention also includes a stretcher lift apparatus for attachment at its one end to the bench while the bench is in the aircraft on the ground. The lift apparatus has telescoping legs at its other end which may be placed on the ground outside the aircraft, so that the stretcher may be placed on the lift outside the aircraft and the legs may be telescoped upward to place the lift more level with the aircraft so that a stretcher may then be more easily slid along the lift into the aircraft onto the bench.

Figure 1:
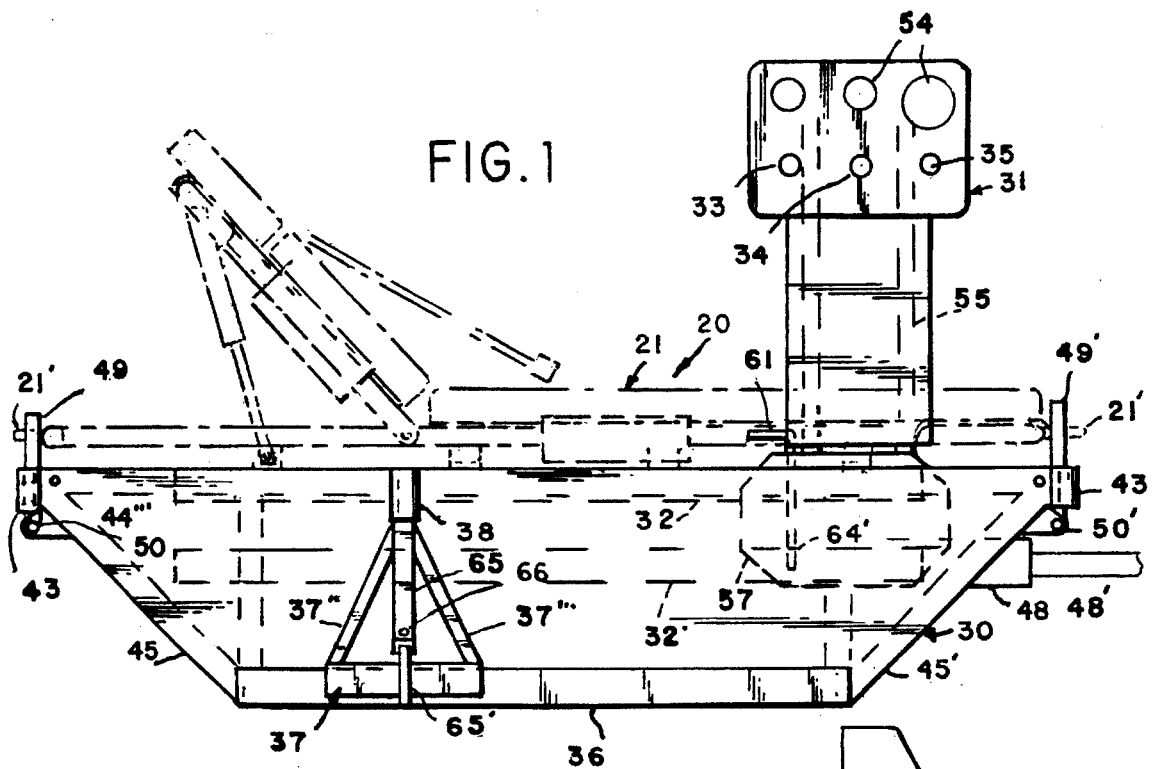
FIG. 1 is a side elevational view of the bench structure for supporting stretcher thereon, which bench has adjustment mechanism for adjusting an outlet attachments for providing such things as oxygen and a vacuum operation for the bench which is adjustable along the length of the bench, and which bench has attachment structure for attachment of a stretcher lift structure thereto.
Figure 5:
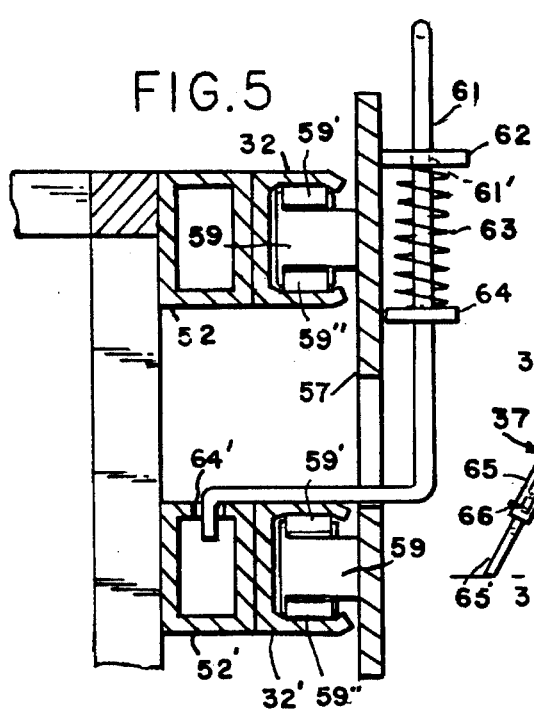
FIG. 5 is a cross sectional view taken along line 5—5 of FIG. 4 illustrating the sliding and latching mechanism for the adjustable outlet structure of the console.
Figure 2:
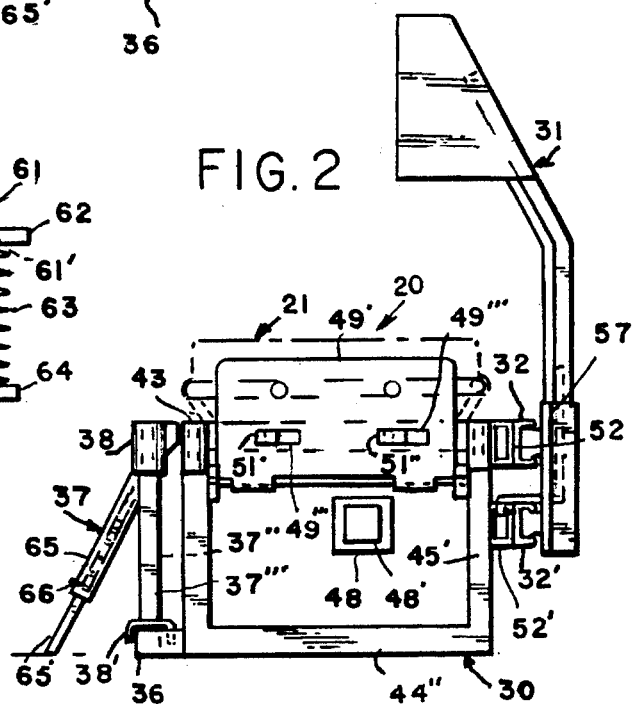
FIG. 2 is an end view of the bench structure of the invention.
Figure 11:
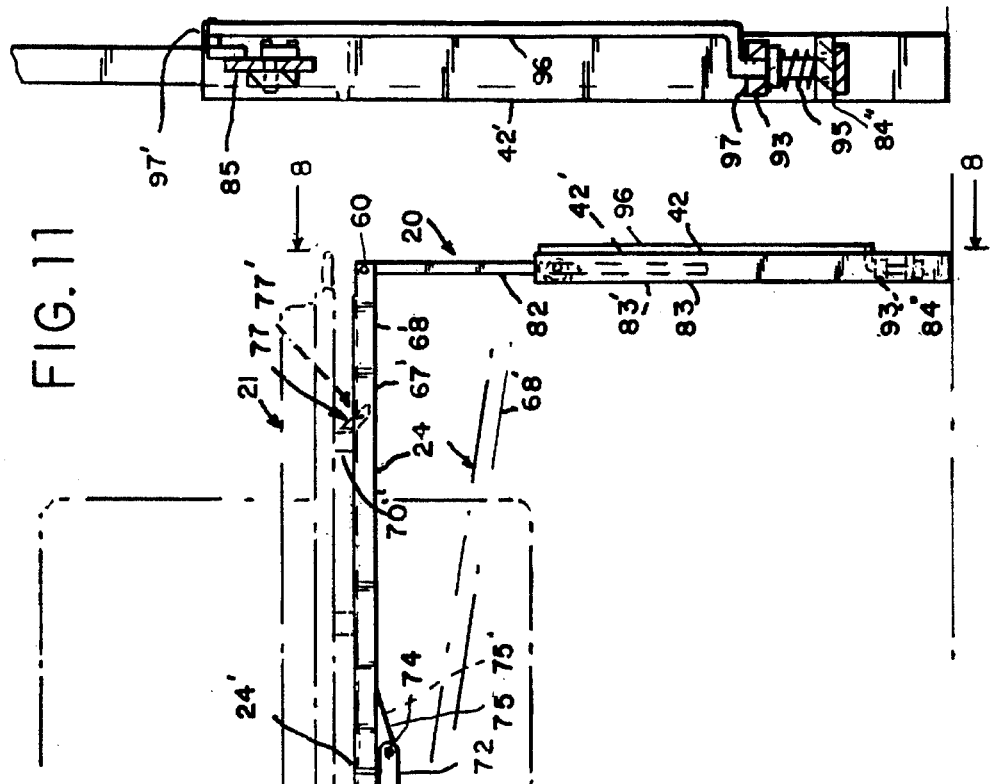
FIG. 11 is a cross-sectional view taken along line 11—11 of FIG. 8.

Referring more particularly to the drawings, in FIGS. 7, the combined stretcher supporting bench and stretcher lift and conveying invention 20 is illustrated. In FIGS. 1 and 2, the bench 30 of the invention is illustrated with a stretcher 21, shown in phantom lines, mounted to the bench.

A slidably mounted outlet console 31 is slidably mounted on a pair of rails 32 and 32' mounted to the back of the bench 30, so that the outlet console may be slid along the bench to a selected location along the bench to place its oxygen outlet 33, vacuum outlet 34, and air pressure outlet 35 at a selected location along the bench, for treatment of a patient on the stretcher on the bench.

The bench 30 also has a rail 36 extending along the one side of the bench. A lift supporting bracket 37 has a main rod 37' with diverging rods 37" and 37''' which diverge outward from the main rod. A sleeve 38 is fixed to the top of the main rod 37' and an inverted U shaped flange 38' is fixed to the bottom of the main rod. The inverted U shaped flange is for engagement over the rail 36 of the bench at a selected location along the bench to adjust the sleeve 38 to a selected position along the bench.

A lift apparatus 41 has a pin 40 at its forward end for slidable mounting in the sleeve 38 of the bracket, so that one end of the lift apparatus 41 may be mounted to the sleeve 38 of the support bracket on the rail of the bench inside the aircraft, while the other end of the lift extends out the aircraft and is supported on a pair of telescopic leg members 42 contacting the ground outside the aircraft, while the aircraft is stationary on the ground. The bench also has four sleeves 43 at the four corners of the bench, which may receive the pin 40, if more convenient.

BENCH

A bench 30 has a pair of side frames 44 and 44' fixed together in spaced relation by a pair of lateral rods 44''' forming the front and rear frames 45 and 45', respectively. A plastic cover or sheet extends along the top and left side frame. The bench 30 is provided to support the stretcher 21, while the stretcher 21 is mounted thereon and the stretcher and bench are mounted in an aircraft, and a patient is supported on the stretcher.

The bench 30 has an oxygen tank, an air pressure pump, and a vacuum pump (not shown) mounted at suitable locations in the bench between the side frames. A horizontal sleeve 48 is also fixed between the side frames, extending from front to rear, with its rear open end 48' accessible so that a lifting apparatus (not shown) having a horizontal lifting rod may have the rod inserted into the open end of the sleeve to raise the sleeve and bench when transporting the bench to an aircraft, for lifting and inserting the bench into the aircraft.

At each end, front and rear, of the bench are locking plates 49 and 49', which are pivotally mounted on rods 50 and 50' fixed across the front and rear ends frames 45 and 45' of the bench. The locking plates 49 and 49' may be pivoted clockwise and counter clockwise, respectively, from each end to pivot the plates over the pins 21' and 21' of the stretcher 21 at each end of the stretcher by the plate's bores 49" receiving the pins 21' and 21" of the stretcher therein.

Slidable locking levers 51 are slidable in bores 45''' in the lateral rods 44" at the front and rear ends of the bench and are slidable from right to left (FIG. 7) in a patch parallel to the length of the plates, while the plates are over the pins to lock the plates to the pins and thereby lock the stretcher to the bench. The levers 51 have laterally projecting ends 51' which are receivable through slots 49''' in the plates so that the laterally hooked ends 51" can hook over the edges of the plats defining the slots when the rods are slid from right to left to lock the levers and thereby the bench to the plates.

A slidable outlet and outlet control console 31 is slidable mounted along the back side frame 44' of the bench on the guide rails 32 and 32', fixed to the back of the bench and spaced outward from the bench by a pair of spaced bars 52. The upper end 53 of the console has the oxygen, vacuum, and air pressure outlets 33, 34, and 35, respectively, with monitoring gauges 54 for each outlet and hose lines connecting an oxygen tank, vacuum and air pressure pump (not shown) in the bench to their respective outlets on the console, and which hose lines will be long enough to provide connections from the tank and pumps to the outlets, regardless of where the console is positioned along the length of the bench.

The console 31 has a framework with a pair of square rods 55' and 55" which extend downward from the console into square sleeves 56 and 56', which sleeves are fixed to plate 57. Pins may be inserted in a bore in each sleeve and through one of a series of bores along the length of the rods 55 and 55' to support the rods and thereby the console at selected heights relative to the plate and bench or a lateral brace 58, fixed between the rods, may rest on the sleeves as shown, at one height.

The plate 57, to which the rods of the consele are mounted has projecting arms 59, with upper and lower rollers 59' and 59" rotatably mounted on the top and bottom of the arms and projecting upward and downward for engaging the upper and lower inside surfaces, respectively, of upper and lower C shaped rails 32 and 32' fixed to the bench 30 to enable the console and its framework to roll along the rails along their upper and lower surfaces. The rails 32 and 32' are fixed to beams 52 and 52', which beams are fixed to the right side framework 45 of the bench.

The rollers 59' and 59" serve as a rolling support for the console 31 and its framework rods 55' and 55', and plate 57, so that the console 31, with the outlets may be rolled along the length of the rails and bench to a selected position along the bench for usinmg the outlets to provide air, oxygen, or a vacuum in connection with providind medical treatment to a patient while on the stretcher on the bench, so that the outlets may be positioned in a more convenient location along the bench for use, depending upon the needs.

A locking rod 61 is slidable mounted axially in a bore 61' in a plate 62, which plate 62 is fixed to plate 57 on the right side thereof of the console 31. A coil spring 63 encircles the rod and its upper end enages the plate 62 and its lower end engages a flange or plate 64 fixed to the bottom of the rod to urge the rod downward to cause the rod 61 to engage in one of the bores 64' in the lower beam 52', which beams serve to space the rails outward from trhe bench. The engagement of the rod 61 with one of the bores serves to lock the console in its position along the bench.

An operator may lift the rod 61, in opposition to its spring, to raise the rod 61 out of one of the bores 64' in the lower beam to release the console 31, so that the console 31 and its framework 31' may be slid or rolled on its rollers 59' rails 32 and 32' fixed to the bench along the length of the bench, or a more convenient location for using one or more of the outlets of the console 31 in connection with providing medical treatment to a patient on the stretcher on the bench.

At each end of the bench are the pair of sleeves 43 fixed to the end frame of the bench, on each side of the pivoting plates 49 and 49'. The sleeves 43 may also receive and support medical support poles for supporting medicines, rather than the pin of the lift.

Along the left side 45 of the bench 30 is the elongated rail 36 extending along the length of the bench 30 and fixed in spaced relation to the bench by a pair of lugs 36', fixed between the rail 36 and the bench.

LIFT MOUNTING BRACKET

The rail 36 serves as a loading bar for attachment of a ramp or lift loading bracket 37 thereto. The left bracket 37 has two diverging rods 37' and 37" which are fixed the main rod 37' at their upper ends and diverge outward and downward from one another. The U shaped strap 38' is fixed to the lower end of the main rod 37'. It is adapted to be received over the loading bar 36 or the bench. A sleeve 65 is fixed to the upper ends of the diverging rods and and a rod 65' is telescoping mounted in the lower end of the sleeve. The rod 65' has a series of holes along its length. The sleeve has a pair of axially aligned holes to receive a pin 65" which pin will extend through the sleeve bores into a selected one of the holes in the rod 65' to adjust the rod 65' relative to the sleeve so that the rod 65' has its lower end abutting the floor of the aircraft with the sleeve by varying the combined length of the sleeve 65 and rod 65'. A flange 66 is fixed to the back of sleeve 38 to abut against the bench 30 to assist in stabilizing the position of the sleeve 38.

LOADING RAMP AND LIFT

The loading ramp apparatus 23 may be provided to assist in loading a stretcher onto a bench or bench module 30, after the bench had been installed in an airplane.

The loading ramp 41 has two sections 23 and 24 which are pivotally connected together at pivot points 25 to pivot the ladder sections together in parallel relation for storage; or to pivot the ladder like sections 23 and 24 apart in parallel, end to end relation to one another for using the ramp with one end outside the aircraft and its other end inside the aircraft attached to the bench.

The front ladder section 23 of the ramp has a rod 67 fixed between the side frame members 67 and 68 of the front section and a cylindrical sleeve 26 is rotatably mounted the rod. The pin 40 is fixed to the sleeve 26, centrally to rotate with the sleeve relative to the ladder sections. The pin on the front section of the ramp is adapted to be received in either one of the four sleeves 43 at the corners of the bench or in the sleeve 38 at the upper end of the loading bracket or lift support bracket 37, when the brackets U shaped member 38' has been mounted over the loading bar 36 of the bench. The other leg 65' of the loading bracket 37 will be adjusted to engage the floor of the aircraft, so that the center axis of the sleeve 38 is perpendicular to the floor of the aircraft.

The ladder sections 23 and 24 each have side frame members 67 and 68 and 67' and 68' respectively. The side frame members 67 and 68 are fixed together by lateral rods 70 and the cylindrical rod 66. The ladder section 24 has its side frame members 67' and 68 fixed together by lateral rods 70' and a lateral strap 70".

Figure 6:
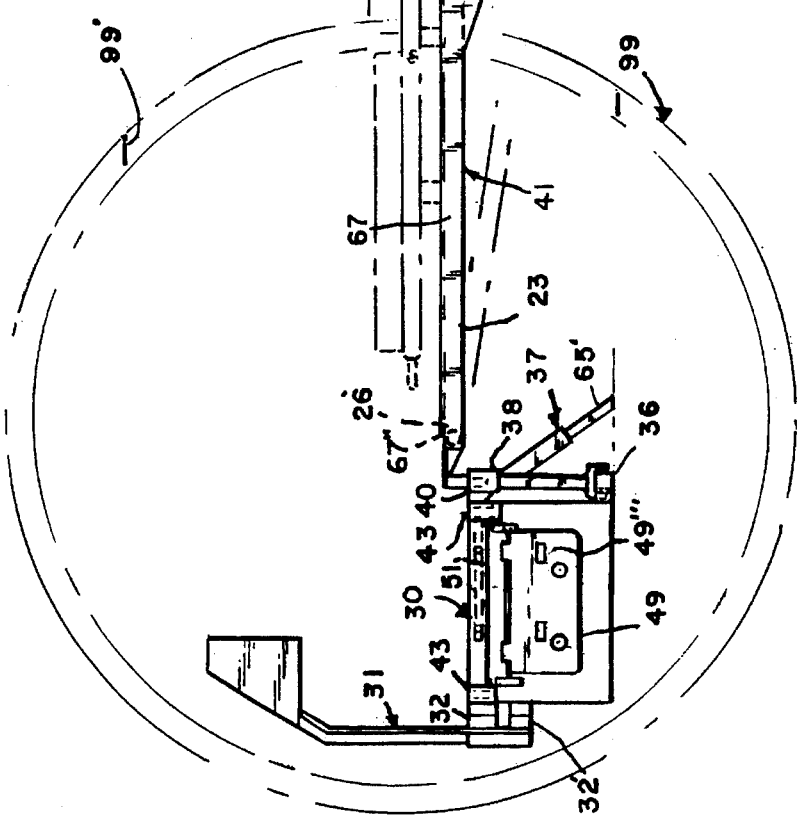
FIG. 6 is a side elevational view of the bench and lift structure, illustrating the bench mounted on an aircraft and the lift having its one end attached to the bench in the aircraft with its other end supported on the ground outside the aircraft, and with a stretcher illustrated in phantom lines being slid along the top of the lift from outside the aircraft to the bench inside the aircraft.

The ladder sections 23 and 24 of the ramp or lift each have sheet metal cover panels 71 and 71' fixed to the side frame members of the ladder sections 23 and 24, respectively The ladder section 23 has a pair of projecting flanges 72 and 73 which project downward and rearward toward the front of rear ladder section 24 with pins 74 pivotally connecting the flanges to flanges 75 and 75' fixed to the front end of rear ladder section 24 to thereby pivotally mount ladder section 23 to ladder section 24 about the axis of pins 74. The inner ends 24' of the ladder sections 23 and 24 abut one another with the ladder section in parallel end to end relation to prevent the ladder sections from pivoting upward toward one another beyond their end to end parallel position is downward force is applied to the sections when positioned as illustrated in FIG. 6.

The rear cover panel 71' has a pair of rectangular slots 76 and 76'. A pair of latch levers 77 and 77' each have a U shaped cross section with points upper and lower ends 78 and 78' respectively. The rear ladder section has a dual pair of verical supporting brackets 79 and 79' fixed to the lateral strap 70".

The latch levers 77 and 77' each have a pin 80 which project through the supporting brackets 79 and 79' and through the side frame flanges 77" of the levers 77 and 77' in rotatable relation to the levers to enable the lever to rotate up about pins 80. A pair of coil springs 81 are wound about the pins with their lower ends 81' abutting the lateral strap 70" and their upper ends 81" abuting the apex of the U shaped levers 77 and 77' to urge the levers clockwise upward to their position shown in solid lines in FIG. 9, with upper ends 78 projecting above the top of the cover panel 71' and their lower ends abutting the the cross brace member 70" to prevent further clockwise movement of the levers and locking them from further clockwise movement. The latch lever may be pivoted counter clockwise under moderate force to their position shown in phantom lines in FIG. 9 with the upper ends 78 below the level of the cover panel 71'. Upon release of the force, the springs will urge the levers back clockwise to their position shown in solid liens with the upper ends of the levers above the cover panel 71'.

At the rear end of ladder section 24 are the pair of telescoping leg members 42 and 42'. Each telescoping leg member has a piston member 82 and 82' respectively, and a cylinder member 83 and 83'. The pistons 82 and 82' are fixed together by a lateral brace member 84 at their upper ends which brace extends laterally betwen them. The cylinder members 83 and 83 have a lateral brace 84' and 84" fixed laterally between the cylinders to fix them together.

The leg members 42 and 42'ar pivotally connected to the side frame members 67' and 68' by pivotally connected pins 69 connected the pistons 82 and 82' to frame members 67' and 68'.

The upper brace 84' of the lower cylinders of the telescoping legs 42 and 42' has a rotary disc 85 rotatably mounted to the upper brace 84' at pivot point 80. A pair of pins 87 are slidably mounted in hollow cylinders 88, which cylinders are mounted to the telescoping legs. The pins 87 have their outer ends projecting into the hollow interior of the lower cylinders 83 and 83' to engage in one of a series of notches 89 along the length of the pistons 82 and 82' to lock the pins in one of the notches 89 and each pin has a spring 90 within the cylinders 88 urging the pins outward into engagement with in the notches in the pistons.

A dual pair of chain links 91 and 91' have their one ends pivotally connected to the inner ends of the pins 87, and have their other ends pivotally connected to a disc 85 on opposite outer edges of the disc along the outer circumference of the disc, whereby rotating the disc clockwise from its position shown in FIG. 8, causes the links to draw the pins 87 toward one another toward the disc in opposition to the outward action of their springs and with draw the outer ends of the pins 87 from engagement with the notches 89 in the pistons, thereby freeing the pistons so that the pistons may be slid upward or downward in the cylinders raising or lowering the rear end of the ramp.

A vertically slidable foot pedal 93 has a pair of parallel rods 94 fixed to the pedal and projecting downward in parallel relation through parallel bores in the brace 84". A pair of coil springs 95 and 95' surround the rods 94 and have their upper ends engaged against the pedal to urge it upward and their lower ends engaged against the brace 84". A lever rod 96 has its one end pivotally connected to the pedal 93 at pivot point 97 and its other end pivotally connected to the disc 85 at pivot point 97', whereby the downward movement of the pedal from its position shown in FIG. 8 causes the lever 96 to move downward which pivots the disc 85 clockwise when viewed from FIG. 8 which draws the links toward one another, drawing the pins 87 toward one another, thereby freeing and releasing the pistons relative to the cylinders.

OPERATION OF THE LOADING RAMP OR LIFT

The loading ramp or lift 41 will be operated as follows:

The ramp 41 will be stored with the sections 23 and 24 pivoted together. When placed in use, the sections 23 and 24 will be pivoted away from one another about their pivotal connection 25, until the inner ends 24' of the sections abut one another in an end to end relation, as illustrated in FIG. 6, thereby locking the sections in an end to end relation against downward folding, when in use.

At some time prior to use, the bench 30 will be installed in an aircraft 99 intended for use in carrying a patient on a stretcher by air to some destination. the bench will be installed in the aircraft with the rail 36 of the bench facing the doorway 99' of the aircraft or as near to the doorway of the aircraft as possible that is the doorway intended to be used for transporting the patient on a stretcher thru and onto the bench. The corner sleeves 43 or some portion along the length of the rail 36, whichever is more convenient, will be placed in front or as nearly in front of the doorway as convenient. The loading bracket 37, if used, will be mounted with its inverted U shaped member positioned over the rail 36 and the leg 65' telescoped in length, by removal of its pin 66 and thereafter adjusting the overall lnegth of the telescoping leg 65' for the sleeve 38 to sit perpendicular to the floor of the aircraft with the bottom of the leg 65' on the floor of the aircraft. After the length of the leg 65' has been adjusted, the pin 66 will then be reinserted in one of the series of holes in the lower leg that now aligns with the single hole in the outer upper leg.

Thereafter, with the bench 30 in the aircraft and the loading bracket 37 attached to the rail; the pin 40 at the front of the ramp front ladder section 23 will be inserted or installed in the sleeve 38 of the loading bracket as illustrated in FIGS. 6 and 7.

Whereupon, the legs 42 and 42' at the rear of the lift may be unfolded and their bottom ends placed upon the ground beside the aircraft, as illustrated in FIGS. 6 and 7. The operator may adjust the height of the rear end of the lift or ramp to make it more convenient to placing a stretchr upon the lift with a patient on the stretcher for sliding the stretcher forward on the lift or ramp onto the bench inside the aircraft. The operator may lower the rear of the lift to its position shown in phantom lines in FIG. 6 for this loading purpose.

The rear telescoping legs 42 and 42' will be pivoted downward in unison, the telescoping lower cylinder members 83 and 83' being together by the lateral braces 84 and 84', until the legs 42 and 42' are pendicular to the ground and the bottom of the telescoping members will rest on the ground. The operator will place his foot upon the foot pedal 93 and press it downward, compressing the springs 95 and 95' as the pedal moves downward toward the brace 84". This draws the rod 96 downward which pivots the disc 92 clockwise which drawa the links 91 and 91' toward one another which in turn draws the pins 87 toward one another which frees the upper pistons 82 and 82' of the legs so that the operator may manually raise or lower the rear end of the ramp and the pistons, relative to the lower cylinders of the legs, until the ramp is at a desired height within the range of the length of adjustment of the pistons, and the operator will take his foot off the pedal 93 releasing the pedal and the springs 95 and 95' will push the pedal back up to its original position which moves the rod 96 upward, which in turn pivots the disc 92 back to its original position, which allows the pins, through the linkage connection and under the urging of their springs 95 and 95; to move into an aligned one of the series of notches 89 in the pistons and lock the pistons relative to the cylinders at their newly aligned position.

The height of the rear end of the ramp or lift will be adjusted until the rear end of the ramp is rearward and downward at an angle to place the rear end sufficiently near the ground for convenient loading the stretcher thereon with a patient on the stretcher.

Since different type aircraft have doorways at different location along the aircraft length; the loading bracket 37, when the bench is on the aircraft and the stretcher with patient thereon is about to be loaded onto the bench with the ramp or lift, will be positioned along the length of the rail 36 of the bench so that the sleeve 38 of the loading bracket receiving the pin 40 at the front of the ramp will be in a position sufficiently in front of the doorway that s stretcher may be slid with a patient thereon on top of the lift along the the top of the ladder sections of the ramp or lift from outside the dooreay of the aircraft onto the bench inside the aircraft, with the stretcher remaining in a substantially horizontal plane while traveling along the ramp or lift onto the bench.

The adjustable loading bracket 37 enables the ramp or lift to be connected with the bracket at different locations along the length of the bench, depending upon what location along the length of the bench is more desirable for the ramp or lift's forward end to be located so as to be in front or sufficiently in front of the doorway of the aircraft to enable the stretcher to be slid horizontally substantially along the ramp or lift onto the bench.

Also, if if necessary, one of the four sleeves 43 located at the corners of the bench may be used to receive the pin 40 of the ramp if more convenient for loading of the stretcher onto the bench through the doorway of the particular aircraft.

Once the ramp or lift has been positioned, as illustrated and just described; the stretcher, with a patient thereon, may be placed upon the rear ladder section 24 of the ramp or lift to the right if desired, of its position shown in FIG. 6. The latch levers 77 and 77' will be pivoted downward counterclockwise from their position shown in solid lines in FIG. 6 by the stretcher rib 28''' as it engages and pushes the levers downward when viewed from FIG. 6 as the stretcher is slid forward toward the aircraft and front section 23. Once the stretcher rib has past over the levers 77 and 77', their spring returns 81 will cause the levers to spring back up to their position as shown in FIGS. 6 & 9, in solid lines, with the lower edges 78' engaging the cross brace 70" of the rear ladder section of the lift while the upper forward edges 78 of levers 77 and 77' will engage against the rear edges of the cross brace 28"" of the stretcher 20 to hold the stretcher 20 against rearward movement relative to the ramp or lift while loading the stretcher with a patient thereon onto the rear ladder section of the lift. The ramp or lift will be inclined slightly rearward and downward by the adjustment of the telescoping legs of the lift to facilitate the stretcher resting against the levers and be held from further rearward movement if the stretcher is left temporarily unattended.

Once the stretcher, with a patient thereon, has been placed on the ramp or lift rear section, the operator may manually raise the rear section to a near horizontal position as substantially shown in FIG. 6, by depressing the foot pedal to release the pins 87 and then telescoping the rear section upward and the releasing the foot pedal to allow the pins 87 to reengage in the newly aigned notchs of the pistons. The operator will normally raise the lift to a near horizontal position with the patient thereon. Thereafter, the operator will slid the stretcher with the patient thereon forward on the lift through the doorway and onto the bench inside the aircraft, and the stretcher will be positioned fully on the bench in alignment between the end plates 49 and 49' as shown in FIG. 1. The end plates 49 and 49' may then be pivoted upward, over the pins 37 and 37' fixed at each end of the rectangular main frame 21' of the stretcher; and the end plates will be locked in this position over the pins, as previously described, to lock the stretcher to the bench inside the aircraft.

Whereupon, the operator may remove the lift from the bench or loading bracket of the bench, by grasping the forward end of the lift and sliding the pin 40 of the lift out of the sleeve 38 of the loading bracket or one of the corner sleeves of the bench to remove the ramp or lift from the bench. Then the rear legs of the ramp or lift may be folded up and the laddersections of the lift or ramp folded together and the lift stored in the aircraft. The mounting bracket may also be removed from the rail of the bench and stored on the aircraft.

Once the aircraft has arrived at its intended destination for delivery of the patient on the stretcher; the ramp or lift may again be unfolded as to the ladder sections and the legs, with the legs again adjustably positioned on the ground outside the aircraft. The bench plates may again be unlocked and the stretcher slid rearward along the lift or ramp to the rear of the lift outside the aircraft for removal of the stretcher, with the patient thereon, for subsequent transportation on the ground.

It is understood that the locking plates 49 and 49' in the bench in cooperation with the pins of the stretcher are already known in the prior art.

The pistons 82 and 82' of the rear telescoping legs of the rear section of the lift may be fluid actuated by fluid actuated cylinders to power the upward telscoping action of the pistons, if desired.

Thus, it will be seen that a novel bench and loading lift for loading a stretcher onto the bench with a patient thereon while the bench is on an aircraft, from the ground through the doorway onto the bench, for subsequent transportation of the patient on the stretcher by aircraft has been provided which enables rapid, relatively easy, and relatively safe loading of the patient on a stretcher into a position in the aircraft with a minimum of time and effort.

It will be obvious that various changes and departures may be made to the invention without departing from the spirit and scope thereof, and accordingly, it is not intended that the invention be limited to that specifically described in the specification or as illustrated in the drawings, but only as set forth in the appended claims wherein;

What is claimed is:

1. A combination comprising a elongated stretcher bench and a elongated stretcher lift in an elongated aircraft body having a doorway along one side of the aircraft body; said bench being adapted to be mounted in length along the length of the aircraft body and occupy a portion of the width of the aircraft body and having means to detachably receive a stretcher along its upper surface; direct attachment means at one end of the lift and along one side of the bench to detachably attach one end of the lift directly to the bench with the upper surface of the lift at the one end of the lift at least substantially adjacent the level of the upper surface of the bench; said elongated lift having a length in excess of the portion of the width of the aircraft body unoccupied by the bench, so that when the one end of the lift is directly attached to the bench, the other end of the lift extends laterally of the length of the bench through the doorway of the body to the outside of the body; said elongated lift having a length at least substantial equal to the length of the stretcher to enable the stretcher to be fully mounted to the lift with the stretcher substantially outside the doorway; adjustable leg means at the other end of the lift adjustable downward laterally of the length of the lift to a length below the level of the bottom of the doorway to directly engage the ground outside the the aircraft body, with portions of the lift intermediate the ends of of the lift spaced above the bottom of the doorway of the aircraft body, when loading the stretcher onto the lift with the lift attached to the bench.

2. A combination according to claim 1, wherein said direct attachment means between the bench and the one end of the lift includes a pivotal connection about a horizontal axis, said adjustable leg means at the other end of the lift are telescopingly adjustable and sufficiently retractable in length laterally of the length of the lift so that the other end of the lift may be lowered by retracting the telescoping legs with the one end of the lift pivoting about its pivotal connection inside the body to place the other end of the lift sufficiently close to the ground that the stretcher may be conveniently loaded onto the lift from the ground outside the aircraft with the intermediate portion of the lift spaced above the bottom of the doorway; said telescoping adjustable leg means being sufficiently telescoping in length to enable the other end of the lift thereafter to be raised to a height at least approaching the height of the upper surface of the bench in the aircraft body, to facilitate moving the the stretcher along the lift onto the bench.

3. A elongated lift according to claim 1 wherein said elongated stretcher has opposing ends with support means adjacent each end for supporting said stretcher, said lift has spring urged one way lock means on the top of the lift, adjacent the other end of the lift, and adapted to allow the stretcher to be moved forward on the top of the lift toward the one end of the lift without interferring with the stretcher movement, while adapted to be spring urged upward to lock the stretcher supports, thereby the stretcher from moving back along the lift toward the other end once the supports are forward of the lock means on the lift, and thereby hold the stretcher on the lift from rearward movement on the lift by the engagement of the lock means with one of the support means on the stretcher.

4. A elongated lift according to claim 1, wherein said lift comprises a forward and rearward elongated panel pivotally mounted together at their inner adjacent ends with means locking the panels from further movement in one pivotal direction when spread apart in end to end relation to enable the panels to provide a rigid continuous straight surface together and to prevent their downward movement relative to one another when the lift leg means are extended downward to provide a surface to support the stretcher along its top, said panels being pivotal together in an opposite direction for storage.

5. A bench and lift according to claim 1 wherein said bench cooperating means and said means at one end of the lift comprises a pin and sleeve connection.

6. A method of attaching a stretcher lift to a lift support means and loading a stretcher onto bench means from the ground wherein the lift support means and the bench means are mounted along an aircraft body with the bench means being elongated along the length of the body and the body has a doorway, said lift support means and said lift have means to detachably directly connect one another and said lift support means have a pivotal connection to one another adjacent their direct connection, wherein said bench means has a width occupying a portion of the width of the aircraft body and has lift has a length in excess of the width of the aircraft body unoccupied by the bench means to enable the lift to extend in length laterally of the length of the bench means through the doorway when directly attached to the lift support means at its one end, and wherein said lift at its one end when directly attached to the lift support means having its upper surface adjacent the level of the upper surface of the bench means and said lift has adjustable legs at its other end adjustable laterally of the length of the lift;

said method of attaching and loading comprising the steps of:
directly connecting said lift at its one end to said lift support means by said direct connection in the aircraft body;
extending the lift at its other end out through the doorway of the aircraft body;
lowering the adjustable legs at the other end of the lift directly to the ground outside the aircraft body;
adjusting the adjustable legs relative to the lift to place the other end of the lift conveniently adjacent the ground to receive the stretcher thereon, with the lift intermediate its ends spaced above the bottom of the doorway in the aircraft body;
loading the stretcher onto the lift while the legs of the lift are directly mounted to the ground with the other end of the lift conveniently adjacent the ground;

raising the other end of the lift upward and adjusting the legs downward relative to the lift so that the legs remain on the ground while pivoting the other end of the lift, with the stretcher thereon, about its pivot at the one end of the lift in raising the lift, so that the other end of the lift is approximately the same height as the upper surface of the bench means and lift at its one end; sliding the stretcher on the lift along the lift through the doorway and onto the upper surface of the bench means.

7. A combination comprising an elongated stretcher lift and support means with said support means being mounted in an elongated aircraft body having a doorway along one side of the aircraft body and a floor; said support means including a stretcher support bench means and lift support means; said bench support means extending in length along the length of the aircraft body and having means to detachably receive a elongated stretcher along its upper surface; said lift support means having a bottom portion directly engaging the floor of the aircraft body and having receiving means along an upper portion; said bench means occupying a portion of the width of the aircraft body, direct attachment means at one end of the lift to detachably attach the one end of the lift to the receiving means on the lift support means with the upper surface of the lift at least substantially adjacent the level the upper surface of the bench means, said elongated lift having a length in excess of the portion of the width unoccupied by the bench means, so that when the one end of the lift is directly attached to the lift support means, the other end of the lift extends laterally of the length of the bench means through the doorway of the body to the outside of the body; adjustable leg means at the other end of the lift adjustable downard laterally of the length of the lift to a length below the level of the bottom of the doorway to directly engage the ground outside the aircraft body, with portions of the lift intermediate the ends of the lift spaced above the bottom of the doorway of the aircraft body, when loading the strecher onto the lift with the lift attached to the lift support means.

8. A combination according to claim 7, wherein said elongated lift has a length at least equal to the stretcher to enable the stretcher to be fully mounted to the lift with the stretcher substantially outside the aircraft body.

9. A combination according to claim 8 wherein said elongated lift has a one way latch means adjacent its other end and is adapted to engage the stretcher along its rearward end, when the stretcher is fully on the lift to prevent rearward movement of the stretcher along the lift but allow forward movement of the stretcher along the lift toward the one end of the lift.

10. In an aircraft, an elongated bench for supporting an elongated stretcher thereon and adapted to be mounted lengthwise along the inside of the aircraft for conveying a patient in the aircraft while on the stretcher with the stretcher extending in length along the length of the bench inside the aircraft, said bench having means to detachably lock the stretcher to the bench along its upper surface, said bench having a movably adjustable service frame member adjustable mounted for movement to various adjusted positions along the length of the bench, said adjustable service member having outlets thereon including an oxygen outlet, whereby said outlets may be adjusted along the length of the bench to a suitable position for use in connection with medical treatment of the patient on the stretcher on the bench.

* * * * *